United States Patent [19]

Brennan

[11] 4,309,878
[45] Jan. 12, 1982

[54] PROCESS AND APPARATUS FOR SEPARATING AND PURIFYING A CRYSTALLINE MATERIAL

[75] Inventor: Earl D. Brennan, Monroeville, Pa.

[73] Assignee: Koppers Company, Inc., Pittsburgh, Pa.

[21] Appl. No.: 180,308

[22] Filed: Aug. 22, 1980

[51] Int. Cl.³ ............................................. B01D 9/02
[52] U.S. Cl. ..................................... 62/542; 62/544; 422/251
[58] Field of Search ................. 62/542, 543, 532, 123, 62/124, 544; 422/251

[56] References Cited

U.S. PATENT DOCUMENTS

| | | | |
|---|---|---|---|
| 2,731,456 | 1/1956 | Weedman | 62/542 |
| 2,770,533 | 11/1956 | Kahmann et al. | 422/251 |
| 2,846,292 | 8/1958 | Harper | 62/542 |
| 3,073,131 | 1/1963 | Ashley | 62/542 |
| 3,290,891 | 12/1966 | Lano et al. | 62/542 |
| 3,872,009 | 3/1975 | Thijssen | 422/251 |
| 4,099,947 | 7/1978 | Ganiaris | 62/542 |

Primary Examiner—Hiram Bernstein
Attorney, Agent, or Firm—Donald M. MacKay

[57] ABSTRACT

An apparatus and process for purifying and separating a crystalline compound from its impurities in a slurry containing same, said process comprising introducing said slurry under pressure into a cylindrical pressurized filter-washer having a substantially constant inside diameter which is substantially free of protrusions, said filter-washer having a filter means with a screen contiguous with an internal surface of the cylinder, said screen having a smooth surface sufficient to provide minimum friction so as to allow a moving bed of crystals to move past it and withdraw a filtrate without blinding, filtering the crystals, withdrawing the filtrate, and moving the crystal bed past the filter screen, applying a controlled restraining force on the crystal bed so as to prevent relaxation and channeling and over-compacting of said bed by means of a compression and harvest means substantially contiguous with said inside diameter and located between said filter means and an exit means, said compression and harvest means comprising a rotatable plate with cutting edges for removing crystals from said bed and perforations for receiving crystals to be passed through said plate to a melting zone, rotating said plate to pass crystals through said perforations, melting the harvested crystals in said melting zone and withdrawing a portion of said melted crystals as purified product from said exit means located in said melting zone, passing the blance of said melted crystals in a countercurrent manner through the perforations in said compression and harvest means and through the moving crystal bed between said compression and harvest means and said filter means, thereby effecting purification by displacing the liquid medium and impurities from the interstices between the crystals.

9 Claims, 4 Drawing Figures

PROCESS AND APPARATUS FOR SEPARATING AND PURIFYING A CRYSTALLINE MATERIAL

BACKGROUND OF THE INVENTION

A process and apparatus is provided for separating and purifying a crystalline material such as a 2,6-disubstituted phenol (DSP) from a slurry of the crystalline material and noncrystalline materials at the same temperature such as a phenol in which only one of the 2 or 6 carbon positions are substituted (MSP). The separation and recovery of said crystalline materials in high purity and yield from its liquid impurities is often difficult, requiring distillation, multiple recrystallizations, crystallization from another solvent or combinations of such operations. The present invention provides a means for continuously recovering in a single stage, crystalline materials of high purity from admixtures with liquid phenolic impurities, gas hydrates or ice from aqueous brines or sea water, and other aqueous or organic mixtures.

BRIEF DESCRIPTION OF THE INVENTION

The process comprises introducing an aqueous and/or organic slurry of DSP or other crystalline material with MSP or other impurity under pressure into a cylindrical pressurized filter-washer having a substantially constant inside diameter which is substantially free of protrusions, said filter-washer having a filter means comprising a screen contiguous with the internal surface of the cylinder, said screen having a smooth surface sufficient to provide minimum friction so as to allow a moving bed of crystals to move past it and withdraw a filtrate without blinding, filtering the crystals, withdrawing the filtrate, and moving the crystal bed past the filter screen, applying a controlled restraining force on the crystal bed so as to prevent relaxation and channeling and over compacting of said bed by means of a compression and harvest means substantially contiguous with said inside diameter and located between said filter means and an exit means, said compression and harvest means comprising a rotatable plate with cutting edges for removing crystals from said bed and perforations for receiving crystals to be passed through said plate to a melting zone, rotating said plate to pass crystals through said perforations, melting the harvested crystals in said melting zone and withdrawing a portion of said melted crystals as purified product from said exit means located in said melting zone, passing the balance of said melted crystals in a countercurrent manner through the perforations in said compression and harvest means and through the moving crystal bed between said compression and harvest means and said filter means, thereby effecting purification by displacing the liquid medium and impurities from the interstices between the crystals.

DETAILED DESCRIPTION OF THE INVENTION

Figure 1:
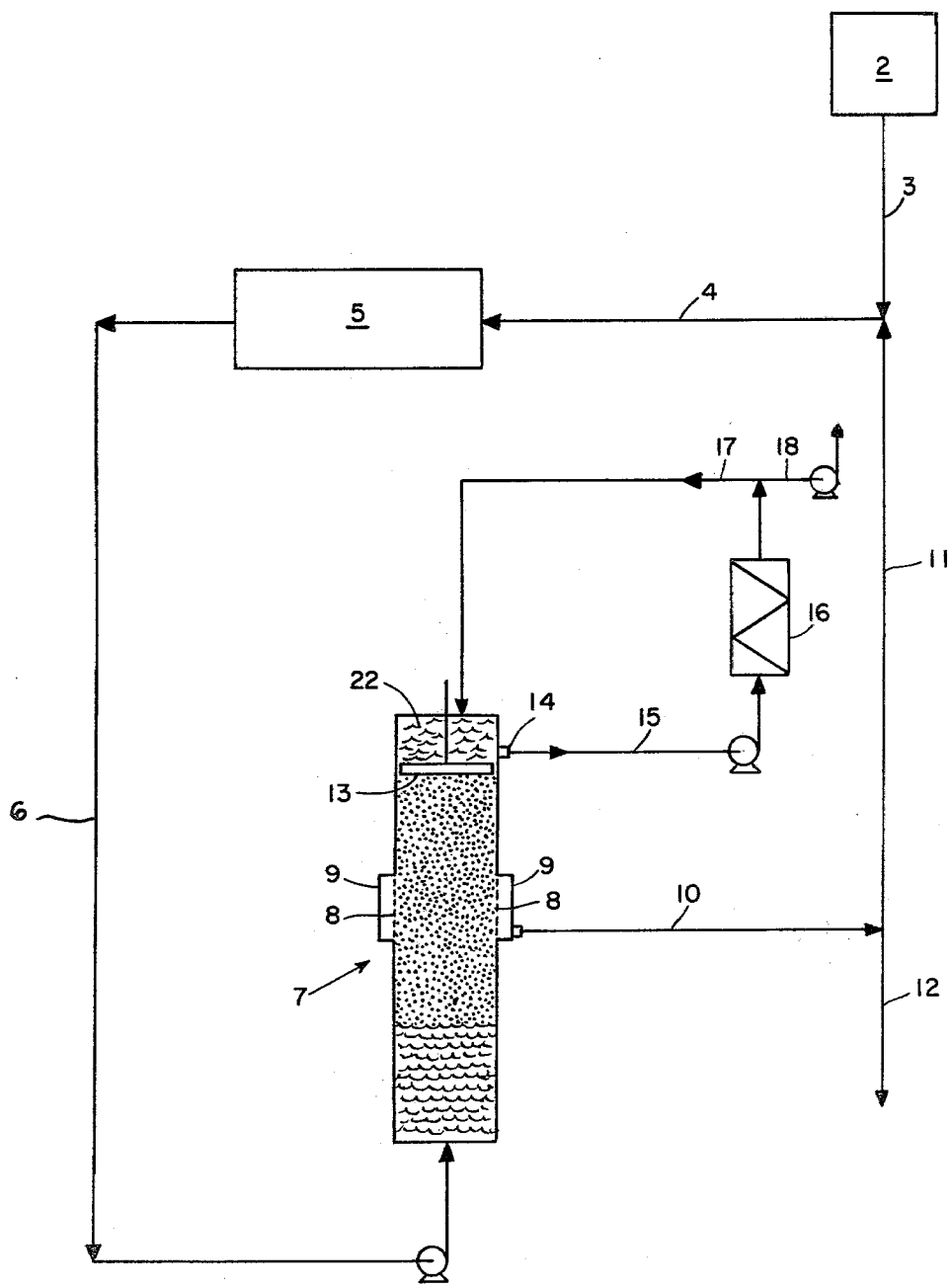
FIG. 1 is a flow diagram of the process of the invention.

Referring now to FIG. 1, an alkylation feedstock 2 containing a 2,6-disubstituted phenol (DSP) and a phenol in which only one of the 2 or 6 carbon positions are substituted (MSP), among other impurities, is passed via conduits 3 and 4 to a crystallization zone 5. Conventional commercial crystallizers can be employed, such as a scraped-surface crystallizer having 29 square feet of scraped surface area manufactured by Armstrong Engineering Co. Typical feedstocks may contain 2,6-ditertiary butyl para-cresol, and 2,4-ditertiary butyl para-cresol, 2,6-xylenol with ortho-, meta-, and para-cresols, and 2,6-dinormal butyl para-cresol with 4,6-dinormal butyl meta-cresol. The crystals are formed from a melt of the crystalline material and materials which are noncrystalline at the same temperature. The resultant slurry is passed under pressure via conduit 6 to a filter-washer 7.

The filter-washer is of substantially constant internal diameter with no substantial protrusions. A filter screen 8 having a smooth surface sufficient to allow crystals to pass by it is housed in a larger diameter pipe 9 with appropriate seals forming an annular space for the collection and removal of filtrate via conduit 10. The filtrate is divided and recycled via conduits 11 and 4 to crystallizer 5 and a portion passed via conduit 12 to a distillation column. As the slurry is fed into the bottom of the filter-washer, filtrate liquor is withdrawn through the filter screen 8 leaving behind crystals which form a bed which builds upon itself. The liquor passing through the growing bed generates a pressure differential which increases until it is sufficient to overcome the forces at the surface of filter screen 8 which hold the bed in place. The bed begins to move upward, replenishing itself with new crystals at the bottom, and when the operation becomes stabilized the bed depth below the filter screen becomes self-regulating. The moving bed firmly pressed against the filter screen by the pressure differential generated by the flowing liquor continually cleans the filter surface and prevents the formation of a stagnant layer of solids which causes reduced filtration rates in ordinary filtrations. Furthermore, crystal fines in the slurry, which cause blinding problems in many filters, are trapped in the deep crystal bed below the filter and are thus prevented from reaching the filter screen. These factors contribute to very high filtration capacities in this apparatus. A preferred filter screen is manufactured by Buckbee Mears Company of St. Paul, Minnesota, and is formed of annealed stainless steel with a thickness of 0.005 inch and has perforations of a diameter of from 0.005 to 0.007 inch with a spacing of 0.0112 inch triangular pitch and 7,960 holes per square inch. Other filters of similar characteristics are also suitable such as Neva-Clog manufactured by Multi-Metal Wirecloth, Inc. Since gravity does not play a part in the operation, the filter-washer can be positioned in a horizontal or a down-flow configuration.

Figure 2:
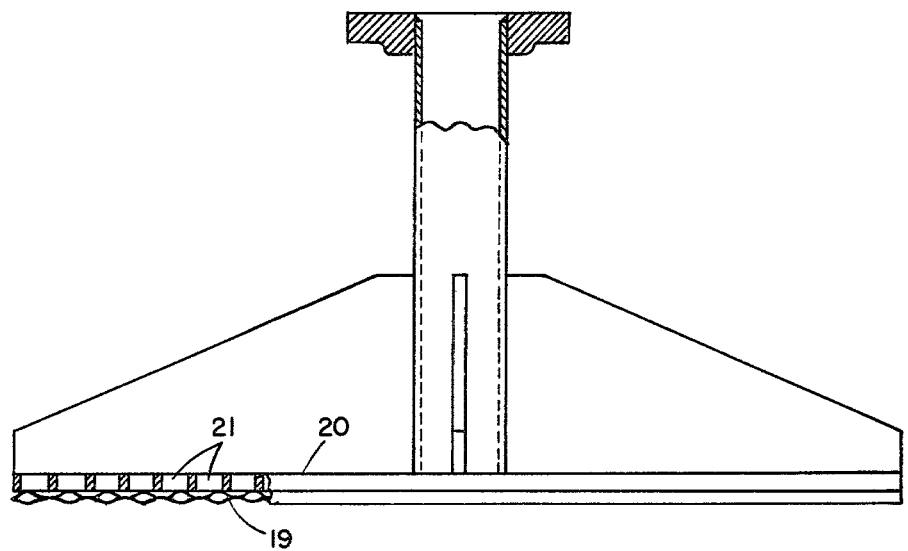
FIG. 2 is a side view of a compression and harvest means.
Figure 3:
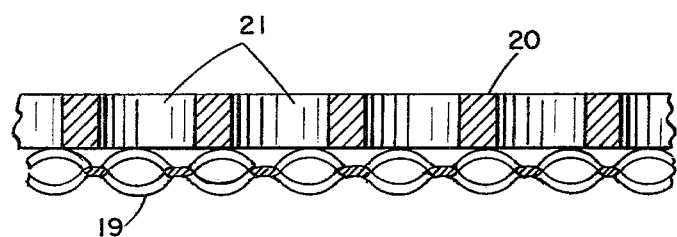
FIG. 3 is an enlarged view of a portion of the scraper blade bottom edge.
Figure 4:
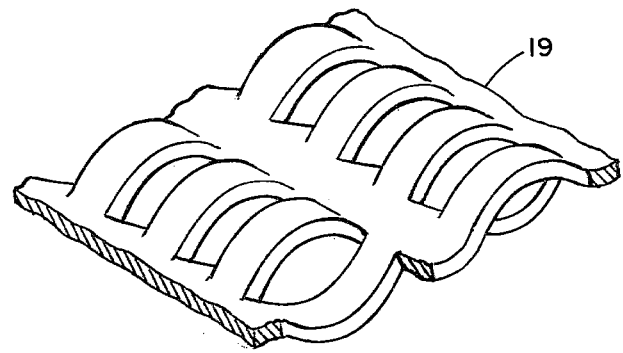
FIG. 4 is an isometric view of the scraper blade bottom edge corrugated material.

As the bed of crystals moves into the upper portion of the filter-washer it is now in the form of a coherent, but porous, crystal piston. However, because the relative flows between liquid and solids within the porous bed are much less in the upper portion of the filter-washer than in the lower section, the porous bed is therefore passing from a zone of relatively high pressure drop to one of relatively low pressure drop. This change in the hydraulic compression forces, if allowed to take place in an uncontrolled manner, is undesirable because it will lead to relaxation and fissuring of the bed, and the result will be inefficient or incomplete washing. A compression and harvest means 13 substantially contiguous with the inside diameter of the filter-washer provides this controlled manner by applying a restraining force on the bed of crystals so as to prevent relaxation and channeling of said bed, but not so much restraint as to cause over-compacting of the bed and high operating pressure differentials. A compression and harvest means of preferred design will apply the proper degree of restraint to the bed while simultaneously maintaining a degree of compaction which will result in a differential pressure of about 100 psi or less, contrasted with a less preferred design which may allow the filter washer to operate as described, but with a differential pressure of about 200 psi or more as a result of overcompacting of the bed. Said means comprises a plate with perforations for receiving crystals to be passed through said plate to melting zone 22 when said plate is rotated. A preferred compression and harvest means is illustrated in FIG. 2 which comprises four scraper blades with a bottom edge 19 formed of a corrugated-like material such as manufactured by Multi-Metal Wirecloth, Inc. of Tappan, New York, under the trade name Por-O-Septa, which is a sheet metal medium, 0.125-inch thick, containing rows of slits on uniform centers. The material between slits is alternately dimpled up and down, forming a configuration of 0.125-inch elliptical openings. This corrugated-like material was cut into four quadrants and adhered to a support plate 20 by welding, with the cutting edges placed at right angles in each quadrant. The support plate 20 was ⅜-inch thick and had holes 21 of ⅜-inch diameter on ⅞-inch centers. An enlarged view of a portion of the scraper blade bottom edge is shown in FIGS. 3 and 4. Other devices for applying a controlled restraining force on the moving bed will occur to one skilled in the art. As the crystals are forced through holes 21 they are taken up and melted in a circulating pool of the molten 2,6-disubstituted phenol maintained above the compression and harvest means in melting zone 22. The heat required for melting is supplied by external heater 16. Purification is effected by the flow of molten material in a direction opposite to that of the moving bed, which provides for countercurrent washing. In addition, a refreezing of a portion of the reflux occurs as the purified melt comes in contact with the relatively cold crystals in the advancing crystal bed, enhancing the purification operation. Part of the circulating melt is removed as product via conduits 15 and 18, and part is recycled via conduit 17 to melting zone 22. By controlling the rate of removal of product from the melt zone so that more material enters the melt zone as crystal bed than is removed as product, the balance of material in the form of melt forces its way back through the moving bed to provide countercurrent washing and a refreezing effect which results in product of extremely high purity of 99+ percent.

The following example will serve to illustrate the invention. All parts and percentages in said example and elsewhere in the specification and claims are by weight unless otherwise specified.

EXAMPLE

An alkylation feedstock 2 containing one part 2,6-ditertiary butyl para-cresol (DTBPC) (88%) and 0.14 part impurities such as 2,4-ditertiary butyl para-cresol, mono butyl para- and meta-cresols, butyl substituted xylenols and mono- and dibutylated phenols was mixed with recycle filtrate from conduit 11 containing 4.20 parts 2,6-ditertiary butyl phenol (66%) and 2.16 parts impurities and the mixture passed via conduit 4 to an Armstrong Engineering crystallizer 5 having 29 square feet scraped surface to provide 5.20 parts DTBPC, or 69 percent of the mixture. The resultant crystalline slurry containing about 20 percent solid DTBPC was passed via conduit 6 to a filter-washer 7 of the type described, at 200 psig and 35° C., wherein 0.75 parts of DTBPC (99%) was recovered via conduit 18 as product and 0.75 parts passed via conduit 17 to melting zone 22, and the 0.75 parts of melted crystals passed through the compression and harvest means, and then through the crystal bed as countercurrent wash and a portion of the filtrate removed via conduit 12 at about 0 psig to be distilled to raise the percentage of DTBPC to preferably about 90 percent. The pressure in the melting zone 22 was about 30 psig, the temperature about 80° C., and the compression and harvest means was rotated at a speed of 40-60 r.p.m. In repeating the process, a 99.9 percent pure DTBPC was obtained from a 90 percent pure feedstock at a production rate of 255 pounds per hour per square foot of column cross section and 99 percent or higher purity was obtained with production rates in the 500 pound per hour per square foot range. In addition, filtration rates of over 100 gallons per hour per square foot of filtration area were obtained. When the purity of the feedstock was reduced from 90 to 72.5 percent, a product purity of over 99 percent was obtained in a single stage at a production rate of 202 pounds per hour per square foot.

Part of the principle of operation of a filter-washer involves the countercurrent washing of a moving bed of crystals with purified melt formed from the crystals. The amount of melt required for this purpose represents the inefficiency of the operation and should be kept to the minimum required to reach a given product purity. To keep melt usage as low as possible, it is desirable that the crystal bed be uniform in porosity and free of channels. In the past it has been maintained that the tendency for channel formation in a bed can be increased if this melt temperature at the top of the bed is too high. By this reasoning, superheated melt can enlarge or perpetuate a channel, resulting in high melt usage and inefficient washing. The conclusion is that the melt temperature should be controlled at a temperature just slightly above the melting point of the pure crystal. It has been discovered, however, that there is an advantage in maintaining a certain degree of superheat in the melt. The advantage lies in a purification effect beyond that achieved by a simple washing by displacement. The mechanism is believed to resemble a "sweating" action where the removal of impure liquor adhering to the surface of a crystal is enhanced by melting a small amount of the crystal. Pure DTBPC has a melting point of 69.8° C. and the temperature of the circulating melt above the moving bed in a filter-washer is normally controlled at between about 78° and about 82° C. Temperatures above 82° C. tend to result in premature erosion of the top of the bed before it reaches the compression and harvest means. Channeling of the bed as a result of the relatively high melt temperatures has not been observed as a problem, particularly after high purities at the top of the filter-washer have been achieved. To illustrate the purification benefit derived from relatively high melt temperatures, experiments were conducted in which the temperature of the melt was adjusted from about 80° C. to 71° C. and back to 80° C. during otherwise steady-state operations. The following changes in product purity were determined:

| Melt Temperature, °C. | | Prod. Purity, Wt. % DIBPC |
|---|---|---|
| Expt. A | 80 | 99.8 |
| | 71 | 98.3 |
| | 80 | 99.8 |
| Expt. B | 79 | 98.3 |
| | 71 | 97.8 |
| | 80 | 98.2 |

The melt usage can be controlled by the application of pressure at the top of a pool of melt above the bed such as with nitrogen, or, preferably, the melt usage can be controlled by simply controlling the rate of removal of product from the melt loop. The melt usage is then indirectly controlled since it represents the difference between the weight rate of solids entering the melting zone 22 and the product take-off rate via conduit 18. The product rate is determined by the desired product purity and thus the melt usage is indirectly controlled to achieve that purity.

What is claimed is:

1. A cylindrical continuous pressurized filter-washer having: a substantially constant inside diameter which is substantially free of protrusions, a filter means having a screen contiguous with an internal surface of the cylinder, said screen having a smooth surface sufficient to provide minimum friction to allow a moving bed of crystals to move past it and withdraw filtrate without blinding, a first entrance means for introducing a feed slurry of crystals to said filter means, exit means for removing crystals separated from the filtered slurry, compression and harvest means substantially contiguous with said inside diameter and located between said filter means and said exit means for applying a controlled restraining force on a bed of crystals from said filter means so as to prevent relaxation and channeling of said bed and over-compacting, said compression and harvest means comprising a rotatable plate with cutting edges for removing crystals from said bed and perforations for receiving crystals to be passed through said plate, a melting zone for maintaining a pool of melted crystals to wash countercurrent crystals prior to passing through said harvest and compression means, said melting zone communicating with said exit means, and a second entrance means for introducing melted crystals to said melting zone.

2. The filter-washer of claim 1 wherein the diameter of the perforations in the filter screen is from between about 0.005 inch to about 0.007 inch.

3. The filter-washer of claim 1 wherein the perforated plate of the compression and harvest means has dimples up and down between perforations forming a configuration of elliptical openings.

4. The plate of claim 3 wherein the openings are about 0.125 inch.

5. The filter-washer of claim 1 wherein the first entrance means is located near the bottom of said column, the filter means is located in a mid-portion of said column, the compression and harvest means is located in an upper portion of said column, the exit means is located above said compression and harvest means, the second entrance means is located at an upper portion of said column above said exit means, and the melting zone comprises the area of the column above the compression and harvest means.

6. A process for purifying and separating a crystalline compound from its impurities in a slurry containing same comprising introducing said slurry under pressure into a cylindrical pressurized filter-washer having a substantially constant inside diameter which is substantially free of protrusions, said filter-washer having a filter means with a screen contiguous with an internal surface of the cylinder, said screen having a smooth surface sufficient to provide minimum friction so as to allow a moving bed of crystals to move past it and withdraw a filtrate without blinding, filtering the crystals, withdrawing the filtrate, and moving the crystal bed past the filter screen, applying a controlled restraining force on the crystal bed so as to prevent relaxation and channeling and over-compacting of said bed by means of a compression and harvest means substantially contiguous with said inside diameter and located between said filter means and an exit means, said compression and harvest means comprising a rotatable plate with cutting edges for removing crystals from said bed and perforations for receiving crystals to be passed through said plate to a melting zone, rotating said plate to pass crystals through said perforations, melting the harvested crystals in said melting zone and withdrawing a portion of said melted crystals as purified product from said exit means located in said melting zone, passing the balance of said melted crystals in a countercurrent manner through the perforations in said compression and harvest means and through the moving crystal bed between said compression and harvest means and said filter means, thereby effecting purification by displacing the liquid medium and impurities from the interstices between the crystals.

7. The process of claim 6 wherein the melted crystals are maintained at a temperature above their melting point sufficient to melt a minor amount of the countercurrent crystals below the compression and harvest means but not so high as to promote channeling.

8. The process of claim 6 wherein the crystalline organic compound is ditertiary butyl para-cresol with a melting point of about 69.8° C. and the temperature of the melted crystals in the melting zone is maintained at between about 78° C. and about 82° C.

9. The process of claim 6 wherein a portion of the filtrate is withdrawn and distilled and the purified product passed to a crystallizer and then to the filter washer, and the remainder of the filtrate returned to said crystallizer, the apportionment of the two filtrate streams controlled so as to maintain the desired purity in the crystallizer.

* * * * *